United States Patent
D'Amico

[15] 3,692,770
[45] Sept. 19, 1972

[54] 3-CYCLOALKYLTHIO-3-AZABICYCLO (3.2.2) NONANES

[72] Inventor: John Joseph D'Amico, Akron, Ohio

[73] Assignee: Monsanto Company, St. Louis, Mo.

[22] Filed: June 3, 1971

[21] Appl. No.: 149,828

Related U.S. Application Data

[62] Division of Ser. No. 17,970, March 9, 1970, Pat. No. 3,627,738.

[52] U.S. Cl. .................................260/239 BA
[51] Int. Cl. .................................C07d 41/04
[58] Field of Search .................260/239 BA

[56] References Cited

OTHER PUBLICATIONS

D' Amico et al., Chem. Abstracts, Vol. 69, Abstract No. 36009y (1968). QD1A51.

*Primary Examiner*—Alton D. Rollins
*Attorney*—Richard O. Zerbe et al.

[57] ABSTRACT

Compounds of the formula

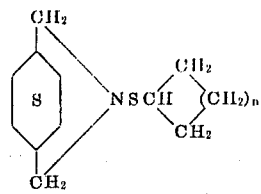

wherein $n$ is 2 to 9 which are stabilizers of organic compounds and inhibitors of premature vulcanization.

4 Claims, No Drawings

3-CYCLOALKYLTHIO-3-AZABICYCLO (3.2.2) NONANES

This application is a division of application Ser. No. 17,970, filed Mar. 9, 1970 now U.S. Pat. No. 3,627,738.

This invention relates to new sulfenamides and to processes for using them in rubber. I have discovered 3-cycloalkylthio-3-azabicyclo[3.2.2]nonanes which compounds inhibit prevulcanization and stabilize decomposible organic compounds, particularly thiazole sulfenamides.

SUMMARY OF THE INVENTION

The sulfenamides of this invention have the formula

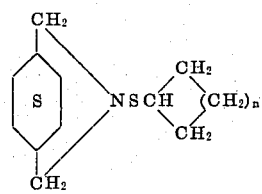

where $n$ is an integer from 2 to 9. They may be prepared by reacting a cycloalkylthio halide with 3-azabicyclo[3.2.2]nonane. Examples of suitable cycloalkyl radicals are cyclopentyl, cyclohexyl, cyclooctyl, cyclodecyl and cyclododecyl.

The new compounds inhibit premature vulcanization or scorch of vulcanizable rubber compositions and activate vulcanization at curing temperatures. This means that rubber stocks containing the inhibitors cure faster yet have greater processing safety. The inhibitor activity is supported by the presence of the cycloalkyl radical. Replacement of the cycloalkyl radical with an aryl radical gives compounds with entirely different properties.

The inhibitors of my invention may be used in natural and synthetic rubbers. Synthetic rubbers that may be improved by the process of this invention include cis-4-polybutadiene, butyl rubber, ethylene- propylene terpolymer rubber, polymers of 1,3-butadiene, for example 1,3-butadiene itself and of isoprene and copolymers of 1,3-butadiene with other monomers, for example styrene, acrylonitrile, isobutylene, and methyl methacrylate. The invention relates to diene rubbers, and the terms rubber and diene rubber are synonymous for the purposes of this invention.

Rubber stocks containing delayed-action accelerators can be used in the process of this invention. The stocks are fully accelerated in the absence of the inhibitor and may contain an amine to protect the rubber from degradation. The amine usually reduces processing safety, but the new vulcanizing systems are effective to prevent premature vulcanization in the presence thereof. More scorchy accelerators can also be used with an excellent degree of improvement. The improved vulcanizing method of this invention can be used advantageously to process stocks containing furnace carbon blacks as well as stocks containing other types of blacks and fillers used in rubber compounding. The invention is also applicable to gum stocks.

The data infra illustrate that a combination of an accelerator and an inhibitor of this invention is an improved rubber additive which allows significantly longer and safer processing time for rubber. Further, the accelerator-inhibitor combinations of this invention may improve the modulus of a vulcanizate considerably. The storage stability of a rubber mixture containing an accelerator-inhibitor combination of this invention is improved compared to a rubber mixture containing an accelerator alone.

My invention is applicable to rubber mixes containing sulfur-vulcanizing agents, organic accelerators, and antidegradants. For the purposes of this invention, sulfur-vulcanizing agent means elemental sulfur or sulfur-containing vulcanizing agent, for example, an amine disulfide, or a polymeric polysulfide. The invention is applicable to vulcanization accelerators of various classes. For example, rubber mixes containing the aromatic thiazole accelerators which include N-cyclohexyl-2-benzothiazolesulfenamide, 2-mercaptobenzothiazole, N-tert-butyl-2-benzothiazolesulfenamide, 2-benzothiazolyl diethyldithiocarbamate, N,N-diisopropyl-2-benzothiazolesulfenamide, and 2(morpholinothio)benzothiazole can be used. Thiazole accelerators other than aromatic can be used. Stocks containing accelerators, for example tetramethylthiuram disulfide, tetramethylthiuram monosulfide, aldehyde amine condensation products, and guanidine derivatives, are substantially improved using the method of my invention. Stocks containing mixtures of accelerators are substantially improved by using the method of my invention. Rubber mixes containing antidegradants, for example N-1,3-dimethylbutyl-N'-phenyl-p-phenylenediamine, N,N'-bis(1,4-dimethylpentyl)-p-phenylenediamine, N,N'-bis(2-octyl)-p-phenylenediamine, and other phenylenediamines, ketone, ether, and hydroxy antidegradants and mixtures thereof, are substantially improved using the process of my invention.

PREFERRED EMBODIMENTS

3-Cyclohexylthio-3-azabicyclo[3.2.2]nonane is prepared as follows:

Cyclohexyl sulfenylchloride (45.1 g., 0.25 mole) in 150 ml. of heptane is added dropwise in 15 minutes to a stirred solution of 3-azabicyclo[3.2.2]nonane (37.5 g., 0.3 mole) and triethylamine (30.4 g., 0.3 mole) in 500 ml. of ethyl ether at 5°–15°C. The mixture is stirred 24 hours at 25°–30°C. 300 ml. of water is added and the mixture stirred an additional 15 minutes. The ether-heptane layer is separated, washed with water until neutral, and dried over sodium sulfate. The ether and heptane are removed in vacuo at 80°–90°C. at 1–2 mm. Hg. The residue is filtered hot to remove one gram of solids. 51 Grams (85 percent yield) of an amber liquid is recovered which solidifies upon standing. The product recrystallized from alcohol melts at 43°–44°C. Analysis of the 3-cyclohexylthio-3-azabicyclo[3.2.2.]nonane gives 70.08% C, 10.69% H, 5.89% N and 13.32% S compared to 70.23% C, 10.53% H, 5.85% N and 13.39% S calculated for $C_{14}H_{25}NS$.

3-Cyclooctylthio-3-azabicyclo[3.2.2]nonane is an amber colored, viscous liquid which when analyzed gives 71.24% C, 10.76% H, 4.85% N and 11.87% S compared to 71.84% C, 10.93% H, 5.24% N and 11.99% S calculated for $C_{16}H_{29}NS$.

3-Cyclododecylthio-3-azabicyclo[3.2.2]nonane is a cream colored solid which melts at 60°–62°C. Analysis gives 4.31% N and 9.78% S compared to 4.33% N and 9.91% S calculated for $C_{20}H_{37}NS$.

The following data illustrate the use of the compounds as inhibitors for premature vulcanization. For the rubber stocks tested and described below, as illustrative of the invention, Mooney scorch times at 121°C. are determined by means of a Mooney plastometer. The time in minutes ($t_5$) required for the Mooney reading to rise 5 points above the minimum viscosity is recorded. Longer times are indicative of the activity of the inhibitor. Longer times on the Mooney scorch test indicate greater processing safety. Increases in scorch delay of the stock containing the premature vulcanization inhibitor over stock which contains no inhibitor is shown. Curing characteristics of the stocks are determined by the Monsanto Oscillating Disc Rheometer. All stocks are cured at 144°C. to achieve optimum cure which is determined from Rheometer data. $t_2$, the time in minutes for a rise of 2 Rheometer units above the minimum reading, and $t_{90}$ is the time required to obtain a modulus 90 percent of the maximum. The difference between these two times, $t_{90} - t_2$, is indicative of cure rate.

A natural rubber masterbatch is compounded as follows:

|  | Parts by Weight |
|---|---|
| Smoked sheets | 100 |
| ISAF carbon black | 45 |
| Zinc oxide | 3 |
| Stearic acid | 2 |
| Hydrocarbon processing aid | 5 |
| Total | 155 |

Stocks are prepared by adding accelerator, antidegradant, sulfur and the prevulcanization inhibitors to the masterbatch Prevulcanization inhibitor is excluded from the control. The properties of the vulcanizates are shown in Table I.

TABLE I

| Stock | 1 | 2 | 3 | 4 |
|---|---|---|---|---|
| Masterbatch | 155.0 | 155.0 | 155.0 | 155.0 |
| N-1,3-Dimethyl-N'-phenyl-p-phenylenediamine | 2.0 | 2.0 | 2.0 | 2.0 |
| N-tert-butyl-2-benzothiazolesulfenamide | 0.5 | 0.5 | 0.5 | 0.5 |
| Sulfur | 2.0 | 2.0 | 2.0 | 2.0 |
| 3-Cyclohexylthio-3-azabicyclo[3.2.2]nonane | —tf | 0.5 | —th | — |
| 3-Cyclooctylthio-3-azabicyclo[3.2.2conane | — | — | 0.5 | — |
| 3-Cyclododecylthio-3-azabicylco[3.2.2]nonane | — | — | — | 0.5 |
| Mooney Scorch at 121°C. |  |  |  |  |
| $t_5$, minutes | 27.7 | 48.0 | 32.9 | 32.7 |
| % Increase in scorch delay | — | 73 | 19 | 18 |
| Rheometer at 144°C. |  |  |  |  |
| $t_2$ | 8.2 | 10.2 | 8.5 | 8.5 |
| $t_{90}-t_2$ | 11.5 | 11.0 | 11.0 | 10.6 |
| 300% Modulus, psi | 1650 | 1850 | 1800 | 1900 |
| Ultimate tensile strength, psi | 3720 | 4120 | 4190 | 4300 |

The accelerator-inhibitor combinations of this invention provide compositions with improved storage stability. For example, thiazolesulfenamide accelerators lose activity upon storage. However, combinations of accelerators and 0.05–50 percent of the stabilizer or inhibitors of this invention after storage show greater vulcanization effectiveness than equivalent portions of the combination if stored alone and combined immediately prior to use. Usually in compositions intended for use as prevulcanization inhibitors, the inhibitor will comprise 5 to 95 percent of the composition by weight, and an organic vulcanization-accelerating agent will comprise 95 to 5 percent by weight of the composition. In general, the inhibitor-stabilizer will comprise 0.025 to 5 percent of the rubber.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A compound of the formula

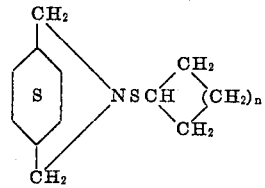

wherein $n$ is from 2 to 9.

2. A compound of claim 1 wherein $n$ is 3.
3. A compound of claim 1 wherein $n$ is 5.
4. A compound of claim 1 wherein $n$ is 9.

* * * * *